_[Patent No.]_ 2,989,483
_[Patented]_ June 20, 1961

2,989,483
METHOD OF MAKING POLARIZED TITANATE CERAMICS

Walter S. Miller, Elmont, N.Y., assignor to American Bosch Arma Corporation, a corporation of New York
No Drawing. Filed Nov. 7, 1958, Ser. No. 772,422
8 Claims. (Cl. 252—62.9)

This invention relates to improved polarized ceramic titanates having a predominance of barium titanate and the improved method of making them.

In recent years, considerable effort has been expended in developing polycrystalline ceramics of a perovskite structure for useful piezoelectric, pyroelectric, ferroelectric, dielectric and other electrical properties. In many cases, various addition agents have been utilized as for example fluxes, to improve characteristics of the ceramics, but in every instance it has been found necessary to permanently polarize the ceramics in a high voltage, unidirectional, D.C. field before such properties were obtained.

In applicant's copending application entitled "Plastic Titanate Piezoelectric Compositions," Serial No. 771,722, filed November 4, 1958, there is disclosed a method for chemically growing a titanate crystal having desirable piezoelectric and other electrical properties without recourse to the usually required firing and polarization steps. In that application it was disclosed that the addition of lithium salts and other additives to a titanate-polyethylene glycol slurry partially reduced the titanate in an exothermic reaction to a complex titanate-titanite crystal. The heat of reaction aided by the presence of the lithium ions yields a complex plastic crystal having a peculiar dipole alignment and a resultant inherent polarization. Other additives, such as selenous acid, were also utilized to provide negative or positive ions for an ionic imbalance in the final product.

Also in another copending application by the same applicant entitled "Ceramic Titanate Piezoelectric Compositions," Serial No. 771,734, filed November 4, 1958, there was disclosed a method of producing piezoelectric ceramic crystals, also from a titanate-polyethylene glycol slurry, involving adding a lithium salt to the slurry to partially reduce the titanate in an exothermic reaction to a complex titanate-titanite crystal, and then subsequently firing the reduced plastic mass to the desired polarized ceramic state. The chemical reduction and crystallization in and by itself did not produce the polarized mass, but the combination of chemical partial reduction and growth controlling additives used, critical in amounts, plus a specific firing schedule did result in the desired polarized ceramics.

It should be noted that in both of the above mentioned applications, the method used critically involved the chemical reduction of barium titanate and other allied titanates in a polyethylene glycol slurry. It is believed that the polyethylene glycol was actually partially decomposed by the heat of reduction and that components from the long-chain polyethylene glycol molecules actively entered the crystalline structure to contribute to the physical, chemical and electrical properties of the resultant product. In any event, the chemically induced polarization and electrical properties of the products of both applications depended to a large extent upon the particular reduction experienced on the formation of the polyethylene glycol slurry.

In contrast with the above described methods of producing polarized titanate compositions, and also in contrast with the generally known method of polarizing a ceramic titanate by placing it in a strong unidirectional electrical field, it is an object of the present invention to provide a method of producing a polarized ceramic titanate wherein the crystal structure of the titanate is inherently polarized only by the particular firing schedule utilized and the presence of certain critical additives. It is also an object to provide a method of producing a polarized titanate ceramic which method obviates either the step of subsequently polarizing the ceramic in a strong unidirectional electric field or of first chemically inducing a particular crystalline growth. It is also an object of the invention to provide a method of producing a polarized ceramic body exhibiting predominantly pyroelectric properties, which method obviates the usually required polarization step, and wherein infra red absorption properties can additionally be obtained by the use of a rare earth oxide additive. Other objects of the present invention will become apparent from consideration of the specification and claims.

In accordance with the above mentioned objects, applicant has developed a method of producing a polarized ceramic body having an inherent dipole alignment induced by a critical and particular firing schedule and the presence of certain additives.

In general, the method is as follows:

Unfired barium titanate and/or other piezoelectric titanate additives are thoroughly mixed or blended or milled in a ball mill to a homogeneous mass or powder, and a small amount of polyvinyl alcohol may be added in limited amounts to create a malleable mass, and also to expedite forming and firing the mass to a particular crystal structure. The purpose of the alcohol is to facilitate the making of a preformed body, and no heat of reduction is noted at this stage. The homogeneous mix may also be fired to a ceramic without the presence of the polyvinyl alcohol. A reducing component, preferably a lithium salt, is homogeneously mixed with the above blended titanates, and again, no exothermic heat of reduction is noted. This is a probable indication that there is no reaction between the lithium salts and the blended titanates at this time. The homogeneous mix is then fired in a reducing or oxidizing atmosphere at an extremely high temperature, sufficient to create a liquid melt. Whether an oxidizing or reducing atmosphere is used depends upon the particular additives utilized in forming the homogeneous mix, and actually, both atmospheres may be used, for instance, the oxidizing atmosphere following the reducing atmosphere. The firing temperature is from 2500–3300° F. and is maintained for a period of about 2–3 hours, depending on the properties desired. During the firing of the mix and the formation of the melt, there is a reaction between the lithium ion and the titanates resulting in a partial reduction of the titanate ion, and also a reorientation of the crystalline grain structure, yielding on cooling a permanently orientated crystallographic grain structure and a polarized ceramic mass.

Both the particular atmosphere used, along with its firing schedule which critically affects the reduction, and the lithium additive, critical in amount, are influential in obtaining the polarization of the ceramic, and also are critical in obtaining the peculiar pyroelectric and other electrical properties exhibited in the final product.

Generally, barium titanate comprises a major proportion of the starting material, being about 85% by weight of the dry homogeneous mix. Additional amounts of other well-known isomorphic titanates of the perovskite type crystal structure may be admixed with the barium titanates to influence the Curie point and other properties of the final product. These are titanates including calcium titanate, lead titanate, and lithium titanate. Amounts of these additives range from 2–10% by weight of the dry mix. Such isomorphic mixtures of barium titanate with other metallic titanates may be grouped and termed "Piezoelectric Metallic Titanates" following the terminology of the Howatt patent 2,503,253.

As a reducing component for the above noted piezoelectric titanate, lithium chloride is preferred. The reducing component is such that the lithium ion is preferably present in the dry mix in about the range of 1–5% based on the dry weight of the mix. The lithium ion may be provided by lithium titanate, which provides a dual function as an isomorphic titanate modifier for barium titanate, as well as an active reducing agent in the melt.

Additional additives may be utilized for radically altering the physical, chemical, and electrical properties of the final product. For instance, a rare earth oxide such as tantalum oxide, may be utilized to provide an infrared absorptive body. Varying the ratio of lithium chloride to tantalum oxide creates a different spectral response depending on the percentages used. Rare earth oxides have been proposed before as catalysts in the forming of titanate ceramics. In the present case, the rare earth oxide is an active donor material for the final crystalline product. Other additives, such as cooper chloride, copper oxide, zinc oxide, and selenous acid, may be utilized to provide predominantly positive or negative crystalline structures. For instance, selenous acid provides negative ions for imbalance in the total crystals. It will be noted that if the compositions of the examples are totalled with respect to the number of electrons in the outer ring of each component that there will be a surplus or a deficit of electrons in the total. For instance, the predominance of positive or negative ions in the crystal structure will influence the dipole alignment achieved in the reduced ceramic crystal and thus alter the various work functions of the final polycrystalline mass.

The preferred atmosphere is a reducing atmosphere consisting of hydrogen, but an oxygen atmosphere may be utilized. The purpose of the atmosphere is to additionally control and effect crystal growth and structure along with the presence of the lithium ions and ionic imbalance ions. It is the combination of the percentage of lithium ions present and firing schedule which produces the specific and particular properties of the final ceramic. As mentioned above, both atmospheres may be used, the oxygen atmosphere following a hydrogen atmosphere.

The utility of the final ceramic can be considerably varied by the nature of the particular additive used. Basically, the material produced is an N-type semiconductor and/or dielectric exhibiting pyroelectrical properties. By using a rare earth oxide in combination with the lithium chloride, a novel translucent glazed body is formed additionally having a specific spectral response. For instance, the Example 2 discloses adding 2% lithium chloride and 1% tantalum oxide to form a ceramic infrared mass having a response in the area of from 2–10 microns in wave length.

*Example No. 1*

Barium titanate—$BaTiO_3$ ____ 84%  
Lead titanate—$PbTiO_3$ _____ 8%   plus 1% lithium  
Calcium titanate—$CaTiO_3$ ___ 8%   titanate—$LiTiO_3$.

A compacted mass of this material when fired in a reducing atmosphere generated a ceramic piece which was a good generator of voltage and current under the influence of heat from 90° to 200° F. There were no indications that this material oxidized at high heat. The material was notably polarity sensitive to the application of heat since the area of heat application becomes positive with the cold area being negative.

The material is also an N-type semiconductor. Firing temperature was about 2600° F. and the time at heat was two hours with the atmosphere being dry hydrogen used to prevent oxidation and to promote crystalline growth and titanate reduction. No polyvinyl alcohol was used.

It should be noted here that the lithium titanate acts both as a titanate modifier and a contributor of lithium ions.

*Example No. 2*

Barium titanate—$BaTiO_3$ _____ 85%.  
Calcium titanate—$CaTiO_3$ _____ 5%.  
Lead titanate—$PbTiO_3$ _____ 5%.  
Lithium titanate—$LiTiO_3$ _____ 2%.  
Lithium chloride—$LiCL$_____ 2%.  
Tantalum oxide—$TaO$ _____ 1% rare earth oxide.

The mixture was thoroughly milled in a ball mill and there moistened with polyvinyl alcohol to create a malleable mass. Casting was accomplished by placing the composition in a preformed plaster cast and firing at 3300° F. for three hours. The end product was a highly translucent glazed ceramic body formed in the desired shape which had a preferred use as a ceramic infra red lens.

Tests revealed that a variance of the mole ratio of LiCl to TaO in a range of about one-fifth created different spectral responses. These responses were in the area of from 2 to 10 microns in wave length and in this area showed an efficiency of better than 45% when used in a lens for adsorption of infra red rays. The ceramic also had pyrolectric response, producing a voltage on the application of heat.

The atmosphere is first a hydrogen atmosphere followed by an oxygen atmosphere with approximately an hour and a half devoted to each.

In both examples, the percentages stated for the various components can be varied by about 20 percent, plus or minus, but variations above that those limits create compounds which are very unstable and which tend to degrade quickly.

I claim:

1. A method of making a polarized ceramic of the perovskite type structure consisting of (a) homogeneously forming a mix of an unfired metallic titanate selected from the group consisting of barium titanate, calcium titanate, lithium titanate, lead titanate and combinations thereof and lithium chloride in amounts such that lithium ions are present in the amount of about 1 to 5 percent based on the dry weight of the mix and (b) subsequently firing the mix at a temperature from about 2500° to 3200° for from about 2 to 3 hours.

2. A method according to claim 1 wherein said firing is conducted in a reducing atmosphere.

3. A method according to claim 1 wherein said firing is conducted first in a reducing atmosphere followed by an oxidizing atmosphere.

4. A method according to claim 1 wherein said metallic titanate is predominantly $BaTiO_3$.

5. A method according to claim 1 wherein said mix further comprises a rare earth oxide homogeneously compounded therewith in the amount of about 1% based on the dry weight of the mix.

6. A polarized ceramic crystal consisting of a dry mix having (a) from 75–90% by weight of $BaTiO_3$, (b) from 5–20% by weight of titanates selected from the group consisting of barium titanate, calcium titanate, lithium titanate, lead titanate, and combinations thereof and (c) from 1–5% by weight of lithium chloride, said mix being fired to completion in a reducing atmosphere at from 2500°–3300° F. from two to three hours.

7. A polarized ceramic crystal comprising in about the following percentages by weight, the reaction product of:

| | Percent |
|---|---|
| Barium titanate—$BaTiO_3$ | 85 |
| Lead titanate—$PbTiO_3$ | 5 |
| Calcium titanate—$CaTiO_3$ | 5 |
| and | |
| Tantalum oxide—$TaO$ | 1 |
| Lithium chloride—$LiCl$ | 2 |
| Lithium titanate—$LiTiO_3$ | 2 | the reaction being conducted first in a reducing atmosphere followed by an oxidizing atmosphere at 3300° F. for about 3 hours.

8. A polarized ceramic crystal consisting of a dry mix having (a) from 75–90 percent by weight of $BaTiO_3$, (b) from 5–20 percent by weight of titanates selected from the group consisting of barium titanate, calcium titanate, lithium titanate, lead titanate, and combinations thereof, (c) from 1–3 percent by weight TaO, and (d) up to 5 percent by weight of lithium chloride, said mix being fired to completion in a reducing atmosphere at 2300° to 3300° F. for from 2 to 3 hours.

References Cited in the file of this patent

UNITED STATES PATENTS

| | | |
|---|---|---|
| 2,520,376 | Roup et al. | Aug. 29, 1950 |
| 2,598,707 | Matthias | June 3, 1952 |
| 2,602,753 | Woodcock et al. | July 8, 1952 |
| 2,721,182 | Clement | Oct. 18, 1955 |